US008516385B1

(12) United States Patent  (10) Patent No.: US 8,516,385 B1
Eismann et al.  (45) Date of Patent: Aug. 20, 2013

(54) LINKING OBJECTS ACROSS STATES AS SHARED OBJECTS

(75) Inventors: Ethan A. Eismann, Oakland, CA (US); Robin James Adams, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1007 days.

(21) Appl. No.: 12/201,337

(22) Filed: Aug. 29, 2008

(51) Int. Cl.
*G06F 3/048* (2006.01)
*G06F 9/44* (2006.01)

(52) U.S. Cl.
CPC .............. *G06F 8/34* (2013.01); *Y10S 715/967* (2013.01)
USPC ............ 715/763; 715/762; 715/967; 717/109

(58) Field of Classification Search
USPC ................... 715/762–763, 967; 717/104–113
See application file for complete search history.

(56) References Cited

U.S. PATENT DOCUMENTS

| 5,642,511 | A | 6/1997 | Chow et al. |
| 5,742,848 | A | 4/1998 | Burgess |
| 5,862,379 | A | 1/1999 | Rubin et al. |
| 6,178,432 | B1 | 1/2001 | Cook et al. |
| 6,564,368 | B1 | 5/2003 | Beckett et al. |
| 6,606,105 | B1 * | 8/2003 | Quartetti ........................ 715/853 |
| 6,823,495 | B1 | 11/2004 | Vedula et al. |
| 7,159,185 | B1 | 1/2007 | Vedula et al. |
| 7,240,328 | B2 | 7/2007 | Beckett et al. |
| 8,006,192 | B1 * | 8/2011 | Reid et al. ...................... 715/762 |
| 2005/0219268 | A1 * | 10/2005 | Kyle ............................... 345/660 |
| 2006/0050142 | A1 * | 3/2006 | Scott et al. .................. 348/14.05 |
| 2006/0235548 | A1 * | 10/2006 | Gaudette .......................... 700/83 |
| 2007/0192745 | A1 * | 8/2007 | Fernandez et al. ............ 715/840 |
| 2008/0270919 | A1 * | 10/2008 | Kulp et al. ...................... 715/762 |

OTHER PUBLICATIONS

"Key Frame", [Online]. Retrieved from the Internet: <URL:http://en.wikipedia.org/w/index.php?title=Key_frame&printable=yes>, (Sep. 18, 2008), 3 pgs.

"Microsoft Expression Blend", [Online]. Retrieved from the Internet: <http://en.wikipedia.org/wiki/Microsoft_Expression_Web>, (Sep. 18, 2008), 1 pg.

* cited by examiner

*Primary Examiner* — Kieu Vu
*Assistant Examiner* — James T Durkin
(74) *Attorney, Agent, or Firm* — Schwegman, Lundberg & Woessner, P.A.

(57) ABSTRACT

A method comprising associating a user interface object and a user interface state of a user interface, the user interface state being at least partially defined by respective configurations of a collection of user interface objects included within the user interface in the state. The method further includes receiving a link instruction identifying an association between the user interface object and a further user interface state. Additionally, the method includes processing the link instruction to associate the user interface object with the further user interface state. The method also includes displaying, a visual representation of the association between the user interface object and the further user interface state.

28 Claims, 15 Drawing Sheets

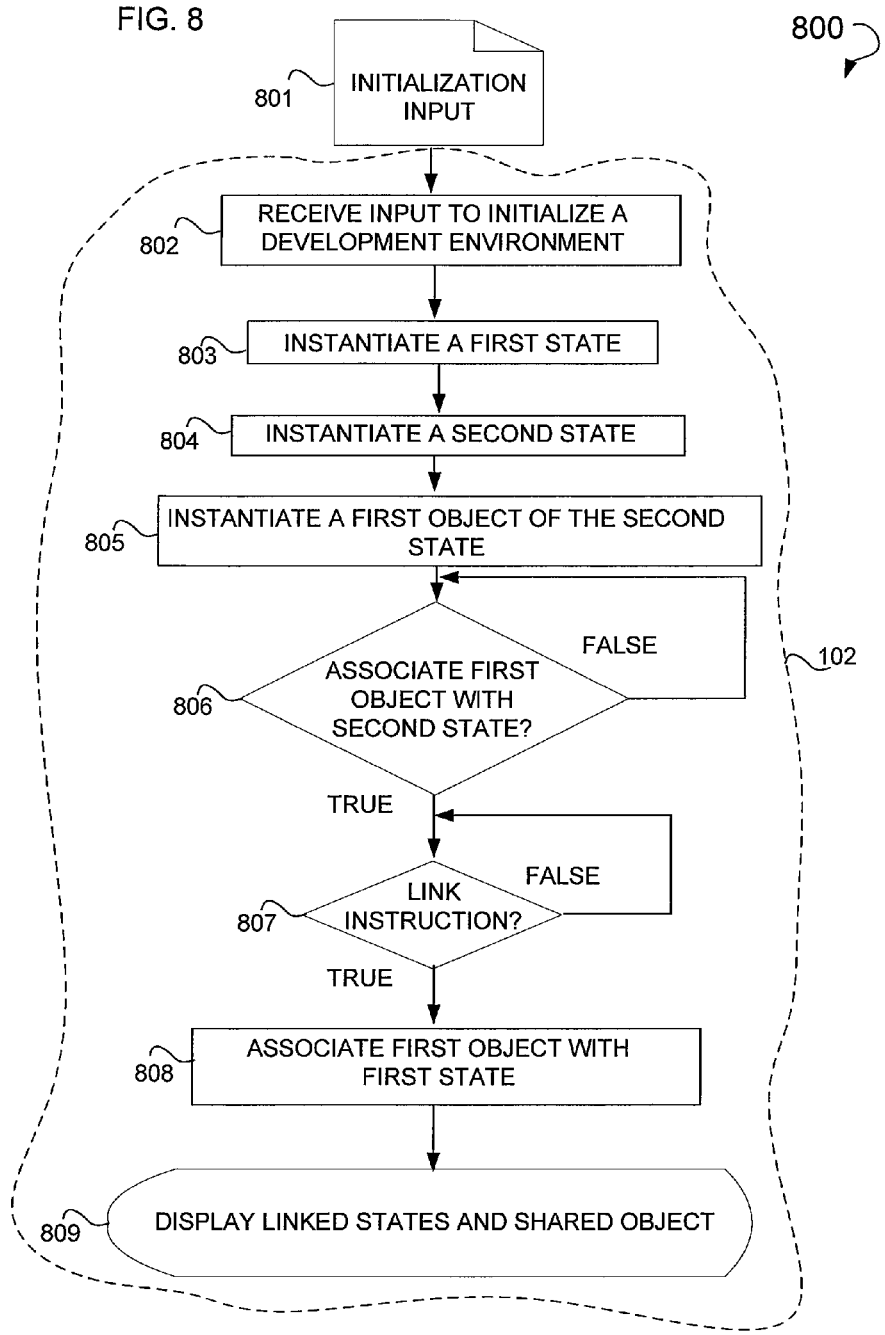

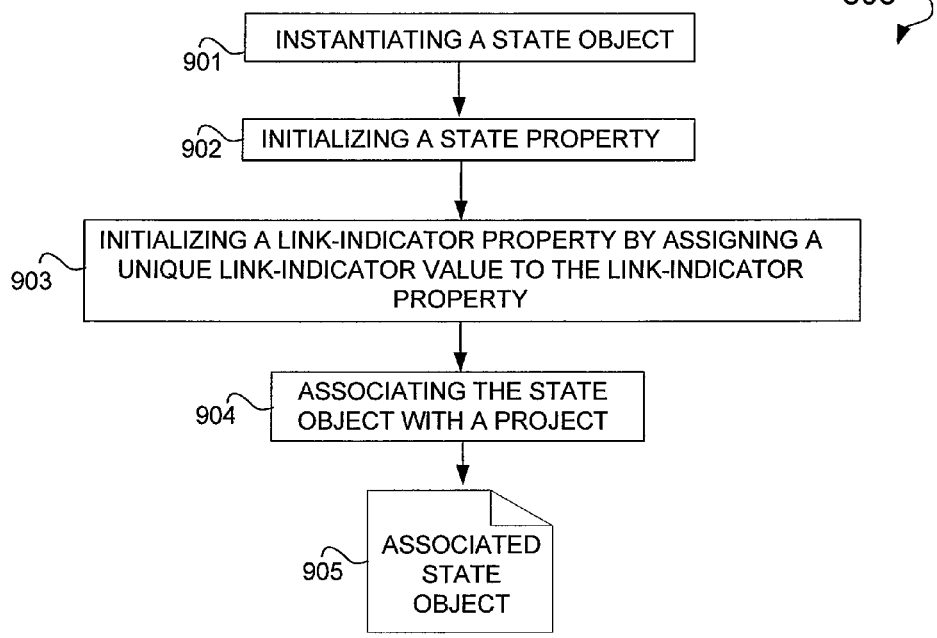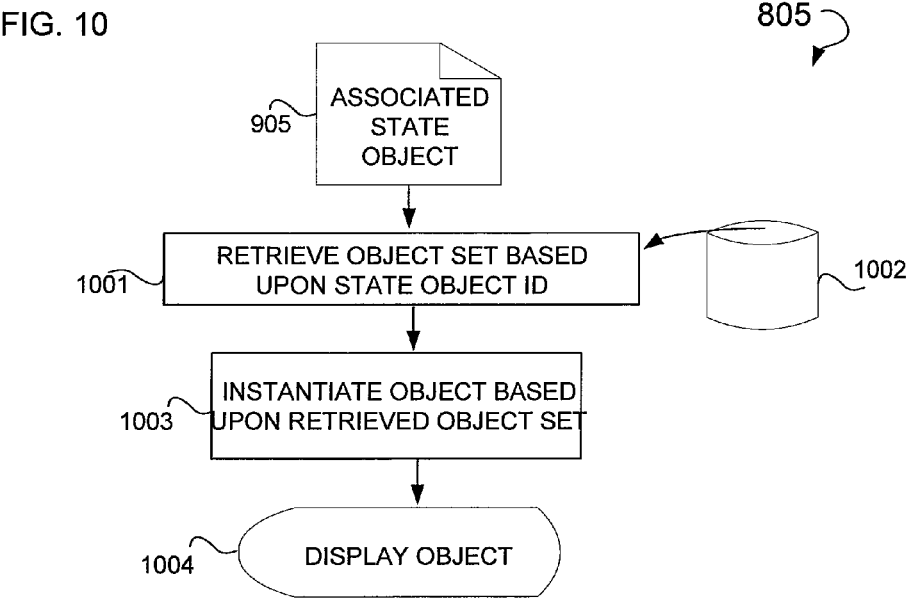

LINKING OBJECTS ACROSS STATES AS SHARED OBJECTS

COPYRIGHT

A portion of the disclosure of this document includes material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software, data, and/or screenshots that may be illustrated below and in the drawings that form a part of this document: Copyright © 2008, Adobe Systems Incorporated. All Rights Reserved.

TECHNICAL FIELD

The present application relates generally to the technical field of algorithms and programming and, in one specific example, Graphical User Interfaces (GUIs).

BACKGROUND

An example of an interface design application is an Integrated Development Environment (IDE) software application that provides comprehensive facilities to computer programmers for software development. An IDE may include a source code editor, a compiler and/or interpreter, build automation tools, and usually a debugger. Sometimes a version control system and various tools are integrated to simplify the construction of a GUI. Many modern IDEs also have a class browser, an object inspector, and a class hierarchy diagram, for use with object oriented software development. Some well known IDEs include GNU EMACS™, ECLIPSE™, VISUAL STUDIO™, and Adobe FLEX BUILDER®.

BRIEF DESCRIPTION OF THE DRAWINGS

Some embodiments are illustrated by way of example and not limitation in the figures of the accompanying drawings in which:

FIG. 8 is a flow chart illustrating the execution of method, according to an example embodiment, used to display linked states and shared objects.

FIG. 9 is a flow chart illustrating the execution of an operation, according to an example embodiment, to instantiate a state.

FIG. 10 is a flow chart illustrating the execution of operation, according to an example embodiment, that instantiates an object of a further state.

DETAILED DESCRIPTION

Figure 1:
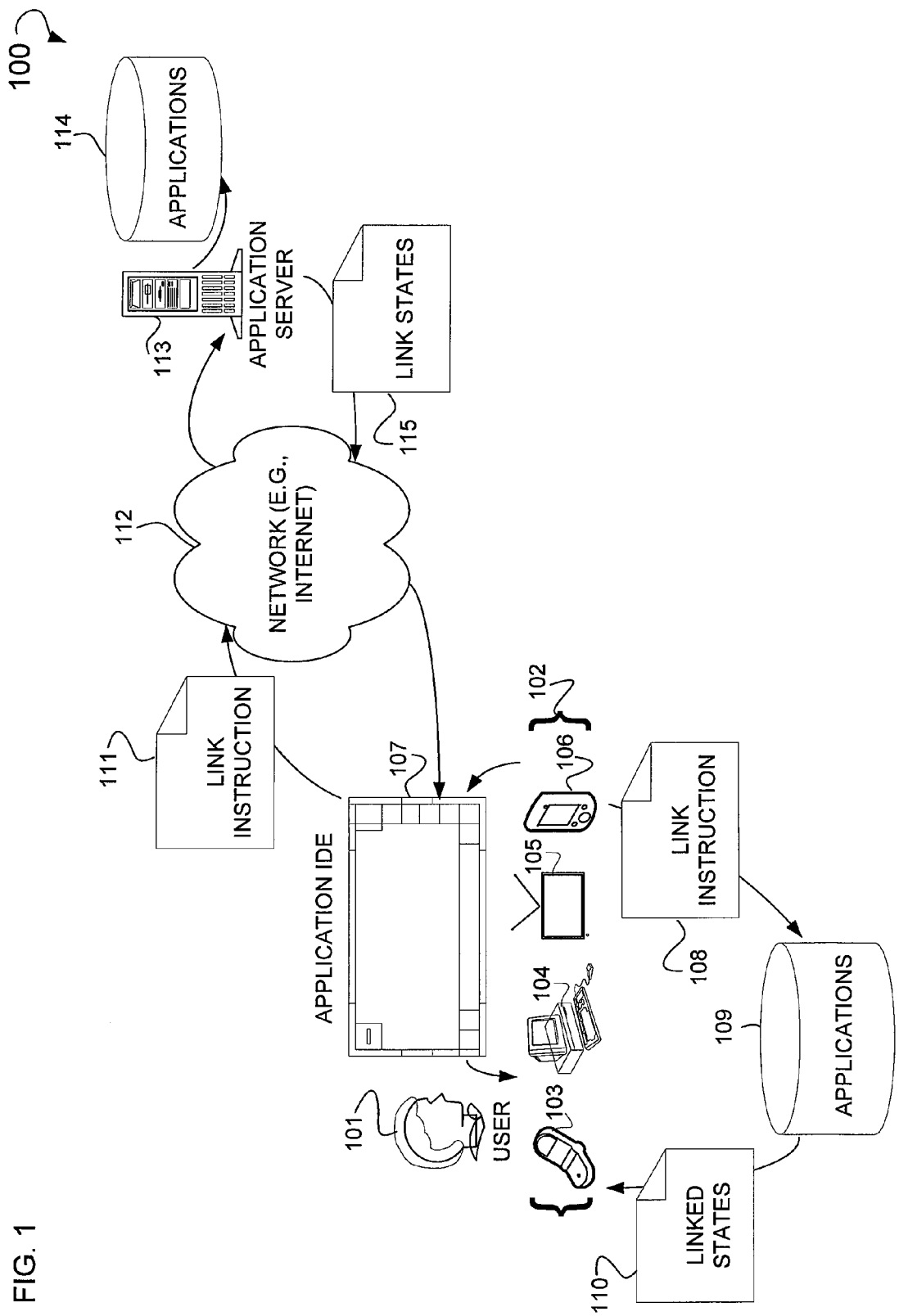
FIG. 1 is a diagram of a system, according to an example embodiment, used to generate a link state.

In the following description, for purposes of explanation, numerous specific details are set forth in order to provide a thorough understanding of an example embodiment of the present invention. It may be evident, however, to one skilled in the art that the present invention will be practiced without these specific details.

In some example embodiments, a system and method are illustrated to facilitate the visual representation of linked user interface objects used in the development of GUIs. A linked user interface object is an object that is accessible to a plurality states. A state is a visual representation of a configuration of object properties, the configuration including whether the property exists or not. In some cases transitions between states are visually displayed. A state is displayed as part of a GUI. A display area may be a frame or sub frame of the GUI. A state is associated with a project, and a state may have one or more layers associated with the state. A layer is a container for associating objects with a state(s). A state and/or a layer may have one or more objects associated with the state and/or layer.

An object is, for example, a component, a widget, user interface control, a layer, a group, a graphic artwork/icon, or a path. A component is a procedure with properties and methods associated with it. Further, properties and methods may be related to an object. A widget is an element of a GUI that displays an information arrangement changeable by the user, such as a window, drop down menu, or a text box. A user interface control is an element of a GUI that is displayed, and has methods and/or properties associated with it. A group is an assemblage of objects. Graphic artwork/icon includes a bit map or vector map image. Formats for a bit map or vector map include the Joint Photographic Experts Group (JPEG), Graphics Interchange Format (GIF), Tagged Image File Format (TIFF), Portable Network Graphics (PNG), or some other suitable file format. A path is an assembly of images.

In some example embodiments, states, layers, and objects are represented via one or more programming language paradigms. For example, the states, layers, and objects may be represented as objects using an object-oriented programming paradigm. In some example embodiments, states, layers, and objects are represented in an eXtensible Markup Language (XML) or Macromedia-XML (MXML) programming language paradigm as a hierarchy. The relationship between a state, a layer and an object may be an inheritance relationship, whereby a state has a layer and/or an object, and the layer has an object. A property, and method, are associated with a state, layer, or object. Properties are descriptions of the state, layer, or object, while methods are functional descriptions. An example of a method is a scroll-up or scroll-down method for a scroll bar object. An example property includes a color, or pattern associated with an object as displayed. A further example of a property associated with an object is a link-indicator property. This link-indicator property may include a link-indicator value (e.g., a boolean, or Globally Unique Identifier Value (GUID)) that is a value used to uniquely identify an object associated with a state. In one example embodiment, the XML or MXML hierarchy is compiled or interpreted into a binary or non-binary scripting language representation, the scripting language including JavaScript, ActionScript, Visual Basic Script, Perl, Python, or some other suitable scripting language.

In some example embodiments, a link-indicator property is displayed as a part of an IDE. This link-indicator property is selected using an input device, with certain functionality, to guide a graphical pointer to select (e.g., focus on) the link-indicator property. An input device may be a keyboard, mouse, light pen, touch screen, or other suitable input device. The functionality of the input device includes a right-click function, a mouse-over function, a left-click function, or some other suitable function. An object of the GUI is selected to receive input through placing the focus of the graphical pointer on the object. Where the link-indicator property is selected, the object to which the link-indicator property corresponds is shared with a further state such that the further state has the object. In some example embodiments, the object is re-instantiated such that a new version of the object is shared with the further state. In some example embodiments, the same object, with the same properties and method as they exist within the first state, is shared with the further state.

In some example embodiments, the link-indicator property is graphically represented within the IDE via an icon (or other visual indicia) that includes a unique pattern, a unique colored, a unique shaped, a color chip (e.g., a colored graphically represented parallelogram), or some other mechanism for uniquely identifying an object. The distinction between link-indicator properties is based upon the distinctness of a icon vis-à-vis other icons, where this distinctness is based upon the above referenced pattern, color, share, or color chip. In one example embodiment, a default icon representing a state is represented within an IDE displaying a further state. This default icon is a place holder property for objects that may potentially be associated with the state. The default icon may be represented graphically as being a grayed out icon. Moreover, a further icon is displayed within the IDE displaying the further state. This further icon is displayed where at least one object is associated with the further state. Using the input device, the default icon is selected such that the object of the further state becomes associated with the state, and is, in effect, replaced with the icon for the object of the state.

Example System

FIG. 1 is a diagram of an example system 100 used to generate the link state. Illustrated is a user 101, who utilizes any one of a number of devices 102 to generate a link instruction 108 via an application IDE 107. The link instruction 108 includes instructions to associate an object with a state, or further state. This association includes making the object accessible to the state for use. An example of accessibility includes the above illustrated inheritance relationship, or an XML hierarchy relationship. These devices 102 include, for example, a cell phone 103, a computer system 104, a television or monitor 105, a Personal Digital Assistant (PDA) 106, or a smart phone (not shown). This link instruction 108 is stored into an applications data store 109. This applications data store may be a persistent or non-persistent data store. Further, this applications data store 109 may be located natively or non-natively on the devices 102. The application data store 109 may be logically or physically connected to the devices 102. Linked states 110 are retrieved from the applications data store 109 by the devices 102 such that the states that are a part of an application are linked by virtue of objects to which the states have common access. Specifically, the objects may be utilized by these states.

In some example embodiments, the devices 102 are operatively coupled to an application server 113 that is used to generate the link states 115. One or more of the devices 102 may be operatively coupled to the application server 113 via a logical or physical connection. This logical or physical connection may be over a network 112. Using the application IDE 107, the user 101 may generate a link instruction 111 that is transmitted across the network 112. This link instruction 111 is received by the application server 113. Additionally, the link instruction 111 may be stored into the application data store 114. This application data store 114 may be located natively or non-natively on the application server 113. The application data store 114 may be logically or physically connected to the application server 113. In some example embodiments, the application server 113 retrieves the link states 115 from the applications data store 114 and transmits it over the network 112 for viewing via the application IDE 107. The link states 115 includes instructions as to what objects should be linked across what states.

Example Interfaces

Figure 2:
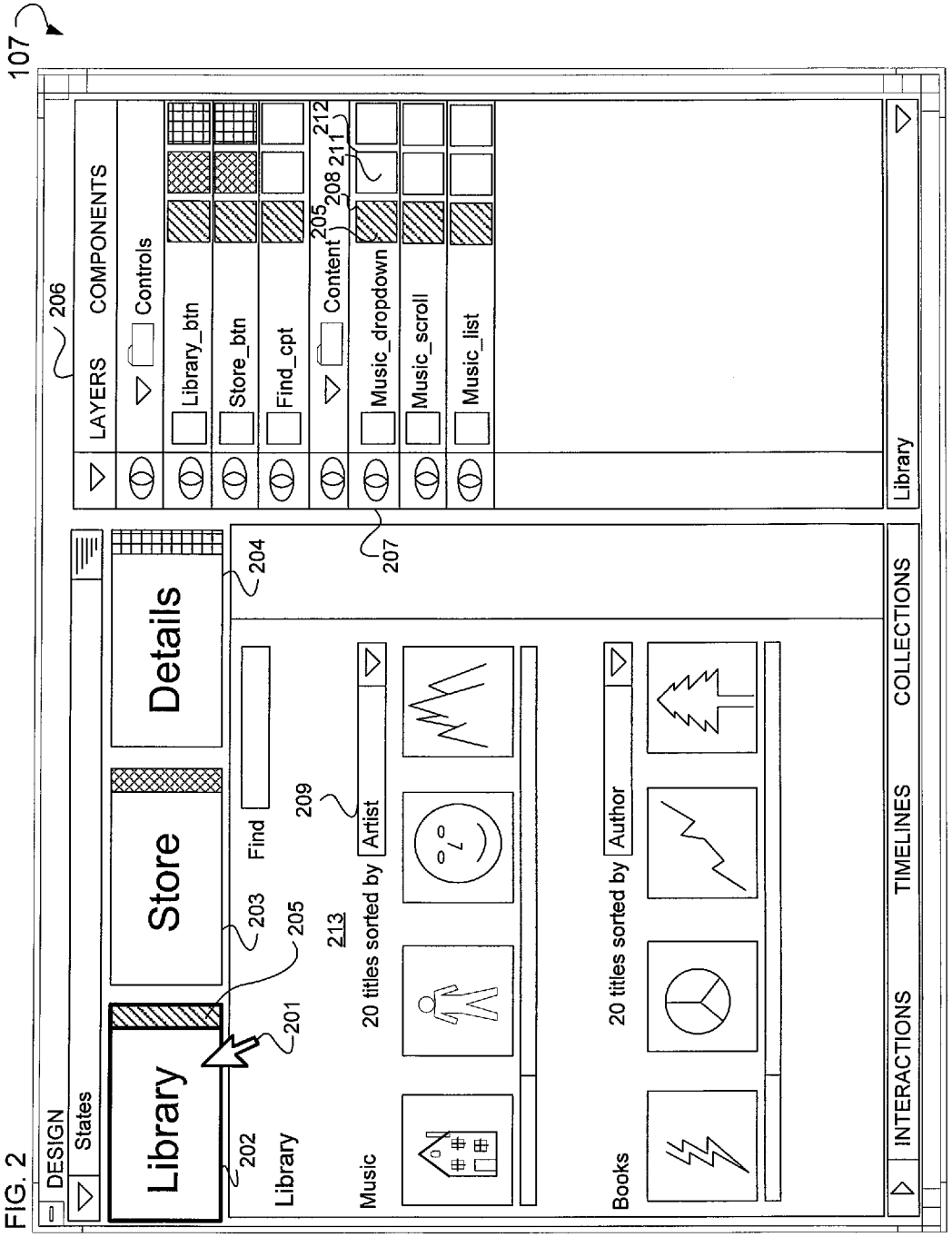
FIG. 2 is a diagram of an application IDE, according to an example embodiment, used to generate a link instruction.

FIG. 2 is a diagram of an example application IDE 107 used to generate a link instruction 108. Shown is a graphical pointer 201 that is used to select a state. Illustrated here are a library state 202, a store state 203, and a detail state 204. Associated with the library state 202 is visual indicia, in the example form an icon 205 having a unique pattern. As illustrated above, some other type of icon may be employed in lieu of the uniquely patterned icon 205. The use of a uniquely patterned icon is for illustrative purposes. Shown is a panel 206 that illustrates layers and objects associated with layers. Here, for example, an object 207 in the form of a music drop down is shown. Associated with this object 207 is a link-indicator property 208 and a link-indicator property 212. The link-indicator property 208 manifests a pattern that corresponds to the uniquely patterned icon 205 of the library state 202. Further, a default icon 211 is shown that is associated with the link-indicator property 212. This default icon 211 may be grayed out or illustrate another icon (e.g., another pattern, shape, color, or color chip). A drop-down menu 209 is displayed as a part of the library state 202. This drop-down menu 209 is the manifestation of the object 207 associated with the library state 202. As will be more fully illustrated below, this association is facilitated through the selection of the object 207 from the panel 206 and the selection may include the use of the graphical pointer 201. Library state 202 is displayed as library state 213 (e.g., a visually displayed state) within the application IDE 107.

Figure 3:
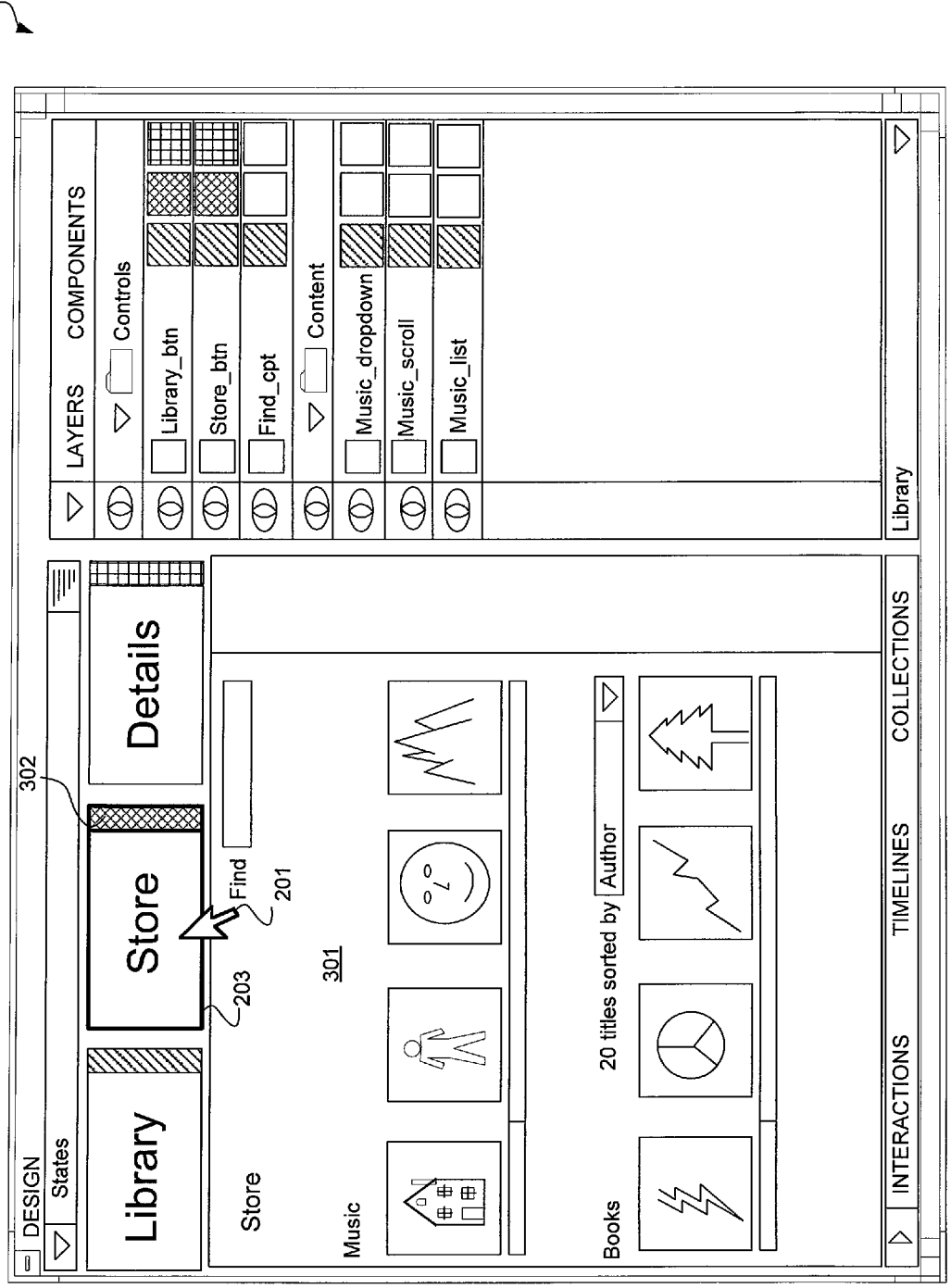
FIG. 3 is a diagram of an application IDE, according to an example embodiment, illustrating a selection of a further state.

FIG. 3 is a diagram of an example application IDE 107 illustrating the selection of a further state. Shown is the graphical pointer 201 that is used to select the store state 203. This store state 203 is displayed within the application IDE 107 as a displayed store state 301 (e.g., a visually displayed state). Associated with the store state 203 is an icon in the form of a uniquely patterned icon 302. As will be more fully explained below, objects associated with the store state 203 will have a link-indicator property that manifests this uniquely patterned icon 302 so as to illustrate an association between the store state 203 and the object.

Figure 4:
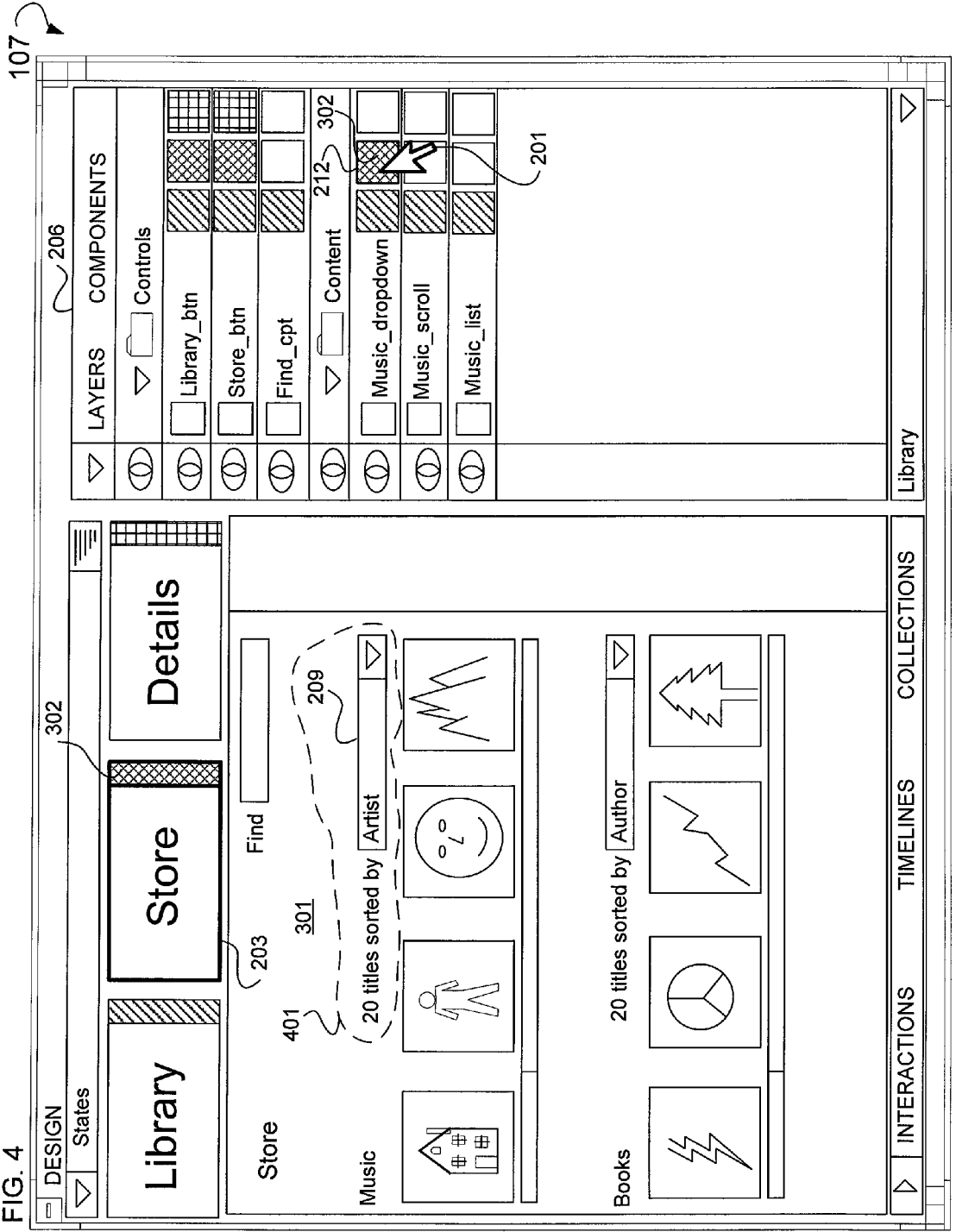
FIG. 4 is a diagram of an application IDE, according to an example embodiment, illustrating a display of linked user interface objects across states.

FIG. 4 is a diagram of an example application IDE 107 illustrating the display of linked user interface objects across states. Shown is the object 209 in the form of a music drop down menu. As illustrated by the uniquely patterned icon 302, this music drop down menu, represented at 401, is associated with the displayed store state 301. This drop down menu 401 is associated with the displayed store state 301 by virtue of the selection of the link-indicated property 212. Specifically, the user 101, utilizing the graphical pointer 201, selects the link-indicated property 212 that includes an icon, and changes the icon from the default icon 211 to an icon in the form of the uniquely patterned icon 302 of the store state 203. In some example embodiments, functionality associated with the graphic pointer 201, includes a right-click function, a mouse-over function, or a left-click function. This functionality is used to change (e.g., select or de-select) the link-indicator property 212 from the default icon 211 to icon in the form of the uniquely patterned icon 302. Further, this functionality may be used to change (e.g., de-select) the link-indicator property 212 from the icon in the form of the uniquely patterned icon 302 to the default icon 211 (not shown).

Figure 5:
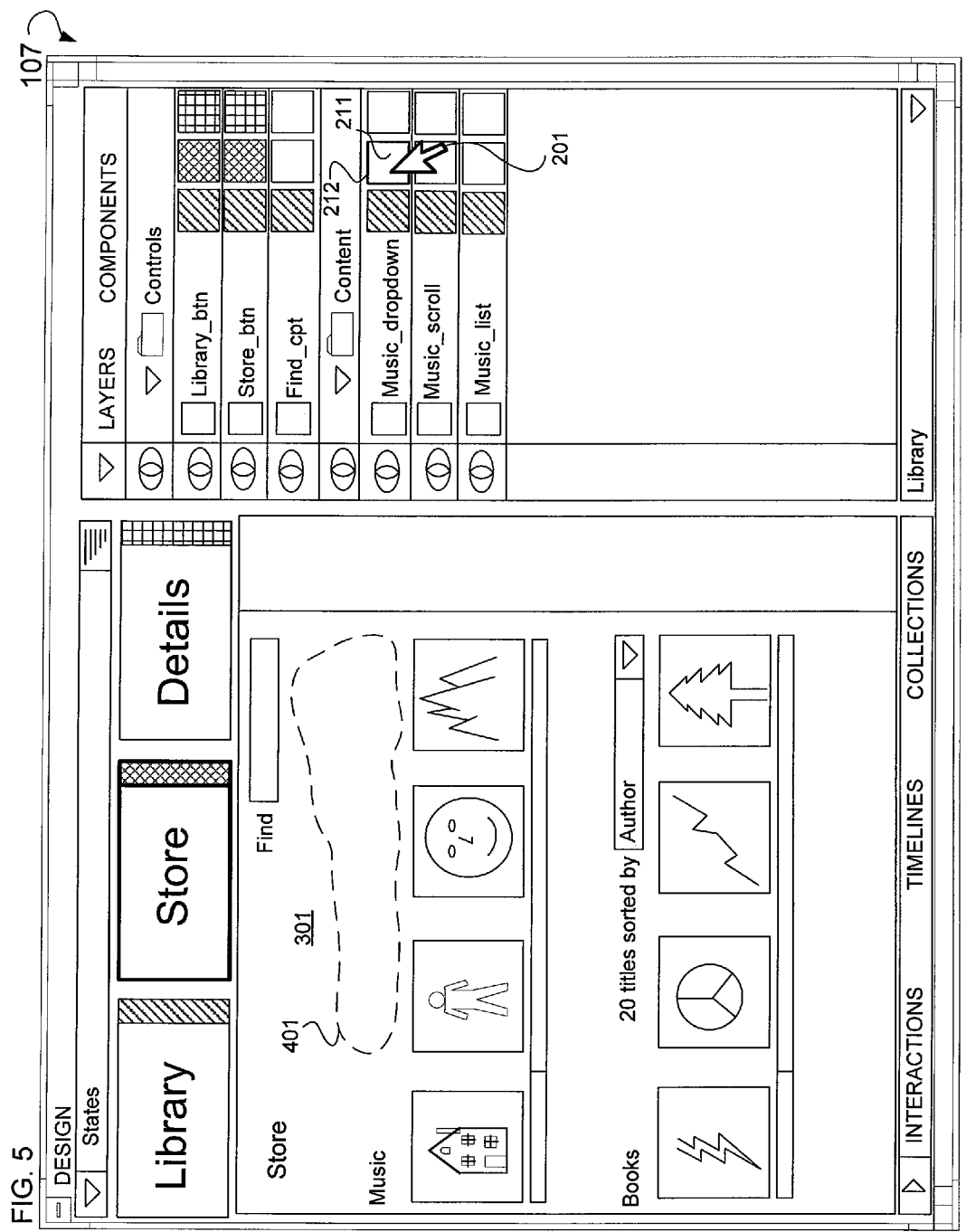
FIG. 5 is a diagram of an application IDE, according to an example embodiment, illustrating a de-selection of a link-indicator property.

FIG. 5 is a diagram of an example application IDE 107 illustrating the de-selection of a link-indicator property. Shown is the graphical pointer 201 that is utilized to de-select the link-indicated property 212. De-selection includes the use of functionality associated with the graphic pointer 201, which includes a right-click function, a mouse-over function, or a left-click function. Where a link-indicated property is de-selected, the object associated with this link-indicated property is removed from a particular displayed state. Here, the music drop down 209 (e.g., here referenced at 401) is removed from the displayed store state 301. Where the link-indicator property 212 is de-selected, the default icon 211 appears within the link-indicator property 212.

Example Logic

Figure 6:
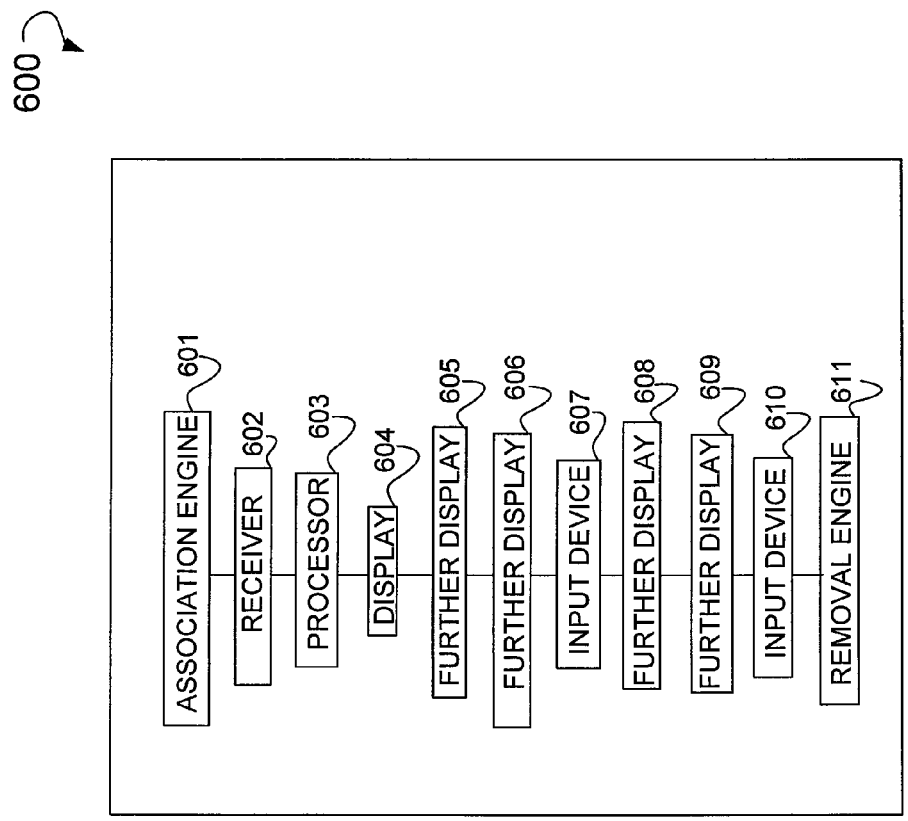
FIG. 6 is a block diagram of a computer system, according to an example embodiment, used to generate a link instruction and to display linked states.

FIG. 6 is a block diagram of an example computer system 600 used to generate a link instruction and to display linked states. The blocks shown herein may be implemented in software, firmware, or hardware. These blocks may be directly or indirectly communicatively coupled via a physical or logical connection. The computer system 600 may be the one or more devices 102, or application server 113. Shown are blocks 601 through 611. Illustrated is an association engine 601 to associate a user interface object and a user interface state of a user interface, the user interface state being at least partially defined by respective configurations of a collection of user interface objects included within the user interface in the state. Communicatively coupled to the association engine 601 is a receiver 602 to receive a link instruction identifying an association between the user interface object and a further user interface state. Communicatively coupled to the receiver 602 is a processor 603 to process the link instruction to associate the user interface object with the further user interface state. Communicatively coupled to the processor 603 is a display 604 to display a visual representation of the association between the user interface object and the further user interface state. In some example embodiments, the user interface object comprises at least one of a component, a widget, user interface control, a layer, a group, a graphic artwork, or a path. In some example embodiments, the user interface state is a configuration of properties of the collection of user interface objects, the computer system further including a further display to present the visual representation of the user interface state within the interface design application. In some example embodiments, the association of the user interface object and the further user interface state includes the user interface object being accessible to the further user interface state. In some example embodiments, the user interface object accessible to the further user interface state includes a property that is specific to the user interface object for the user interface state. (See e.g., FIG. 11.) In some example embodiments, the property includes at least one of a color, or a pattern. Further, in some example embodiments, the association of the user interface object and the further user interface state includes a relationship including at least one of an inheritance relationship or an XML hierarchy relationship.

In some example embodiments, the compute system 600 includes the display 604 operatively coupled to the further display 605 to display, in the display area, a visual representation in a form of an icon that represents the association of the user interface object and the user interface state. Communicatively coupled to the further display 605 is a further display 606 that displays, in the display area, a default icon representing a potential association of the user interface object with the further user interface state. Communicatively coupled to the further display 606 is an input device 607 to select the default icon to associate the user interface object with the further user interface state. Communicatively coupled to the input device 607 is a further display 608 to display the user interface object for view in the display area. Communicatively coupled to the further display 608 is a further display 609 to display the user interface object for view in the further user interface state. Communicatively coupled to the further display 609 is an input device 610 to de-select the icon to disassociate the user interface object from the further user interface state. Communicatively coupled to the input device 610 is a removal engine 611 to remove the user interface object from view in the display area. In some example embodiments, the removal engine 611 removes the user interface object from view in the further user interface state. In some example embodiments, the icon includes at least one of a pattern, a color, a shape, or a color chip. In some example embodiments, the user interface object and the further user interface state share a common representation of an icon, the icon representing the association between the user interface object and the further user interface state. In some example embodiments, the interface design application includes an IDE. In some example embodiments, the display 604, further display 605, further display 606, further display 608, and further display 609 are incorporated into the same display 604.

Figure 7:
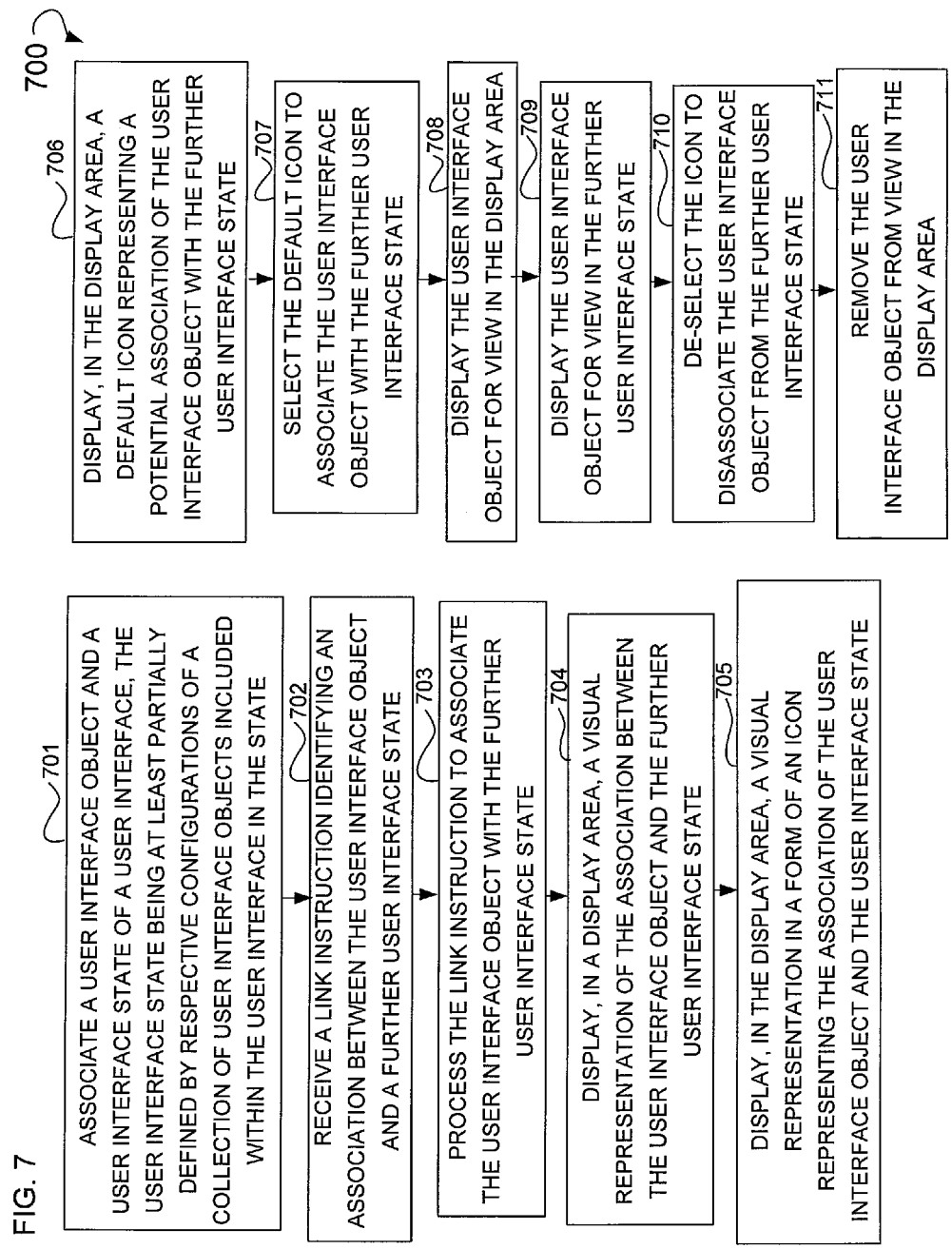
FIG. 7 is a flow chart illustrating a method, according to an example embodiment, used to generate a link instruction and to display linked states.

FIG. 7 is a flow chart illustrating an example method 700 used to generate a link instruction and to display linked states. Shown are various operations 701 through 711 that may be executed on the one or more devices 102, or application server 113. Shown is an operation 701 that is executed by the association engine 601 to associate a user interface object and a user interface state of a user interface, the user interface state being at least partially defined by respective configurations of a collection of user interface objects included within the user interface in the state. Operation 702 is executed by the receiver 602 to receive a link instruction identifying an association between the user interface object and a further user interface state. Operation 703 is executed by the processor 603 to process the link instruction to associate the user interface object with the further user interface state. Operation 704 is executed by the display 604 to display a visual representation of the association between the user interface object and the further user interface state. In some example embodiments, the user interface object comprises at least one of a component, a widget, user interface control, a layer, a group, a graphic artwork, or a path. In some example embodiments, the user interface state is a configuration of properties of the collection of user interface objects, the method further including presenting the visual representation of the user interface state within the interface design application. In some example embodiments, the association of the user interface object and the further user interface state includes the user interface object being accessible to the further user interface state. In some example embodiments, the user interface object accessible to the further user interface state includes a property that is specific to the user interface object for the user interface state. In some example embodiments, the property includes at least one of a color, or a pattern. Additionally, in some example embodiments, the association of the user interface object and the further user interface state includes a relationship including at least one of an inheritance relationship or an XML hierarchy relationship. Operation 705 is executed by the further display 605 to display, in the display area, a visual representation in a form of an icon representing the association of the user interface object and the user interface state. Operation 706 is executed by the further display 606 to display, in the display area, a default icon representing a potential association of the user interface object with the further user interface state.

In some example embodiments, the method 700 includes an operation 707 executed by an input device 607 to select the default icon to associate the user interface object with the further user interface state. Operation 708 is executed by the further display 608 to display the user interface object for view in the display area. Operation 709 is executed by the further display 609 to display the user interface object for view in the further user interface state. Operation 710 is executed by the input device 710 to de-select the icon to disassociate the user interface object from the further user interface state. Operation 711 is executed by the removal engine 611 to remove the user interface object from view in the display area. In some example embodiments, the operation 711 is also executed by the removal engine 611 to remove the user interface object from view in the further user interface state. In some example embodiments, the icon includes at least one of a pattern, a color, a shape, or a color chip. In some example embodiments, the user interface object and the further user interface state share a common representation of an icon, the icon representing the association between the user interface object and the further user interface state. Additionally, in some example embodiments, the interface design application includes an IDE.

FIG. 8 is a flow chart illustrating the execution of method 800 used to display linked states and shared objects. Shown are various operations 802 through 809 that may be executed by one or more of the devices 102. Illustrated is an initialization input 801 that is received through the execution of operation 802. The initialization input 801 includes default values to initialize the application IDE 107. Operation 802 initializes the application IDE 107. An operation 803 is executed that instantiates a first state. Instantiate includes generating an instance of an object in the form of a state. An operation 804 is executed that instantiates a second state (e.g., a further state). Operation 805 is executed that instantiates a first object of the second state. A decisional operation 806 is executed that determines whether the first object is associated with the second state. In cases where decisional operation 806 evaluates to "false," decisional operation 806 is re-executed. In cases where decisional operation 806 evaluates to "true," a further decisional operation 807 is executed. Decisional operation 807 determines whether or not a link instruction has been received. This link instruction may be the link instruction 108, and may be generated by the user 101. For example, the user 101, by utilizing the graphical pointer 201, may select a link-indicator property such that an object is linked across states. (See e.g., FIG. 4.) Where decisional operation 807 evaluates to "false," decisional operation 807 is re-executed. In cases where decisional operation 807 evaluates to "true," operation 808 is executed. Operation 808 associates the first object with the first state thereby linking the object across states (e.g., the first object is linked to both the first and second states). A display 809 is executed that displays the linked states and shared objects (see e.g., FIG. 4).

FIG. 9 is a flow chart illustrating an example execution of operation 803. Shown is an operation 901 that instantiates the state object. An operation 902 is executed that initializes a state property. Operation 903 is executed that initializes a linked indicator property by assigning a unique indicator value to the link-indicator property. This initialization of the link-indicated property may also include the use of the previously referenced default icon (see e.g., link-indicator property 212 and default icon 211). Specifically, a default icon may be associated with the link-indicator property. Further, this initialization may include the association of certain default layers and/or objects with the initialized state. These layers and/or objects may be identified via certain unique state object or state layer ID values. Operation 904 is executed to associate the state object with a project. An associated state object 905 is generated as a result of the execution of operations 901 through 904.

FIG. 10 is a flow chart illustrating an example execution of operation 805. Shown is the associated state object 1005. An operation 1001 is executed that retrieves an object set based upon a state object ID retrieved from the associated state object 1005. This object set is retrieved from a data store 1002. An operation 1003 is executed and instantiates an object based upon retrieved objects set. Operation 1004 is executed that displays the objects. An example of a displayed object is illustrated in FIG. 2 in the form of the musical drop down 209.

Figure 11:
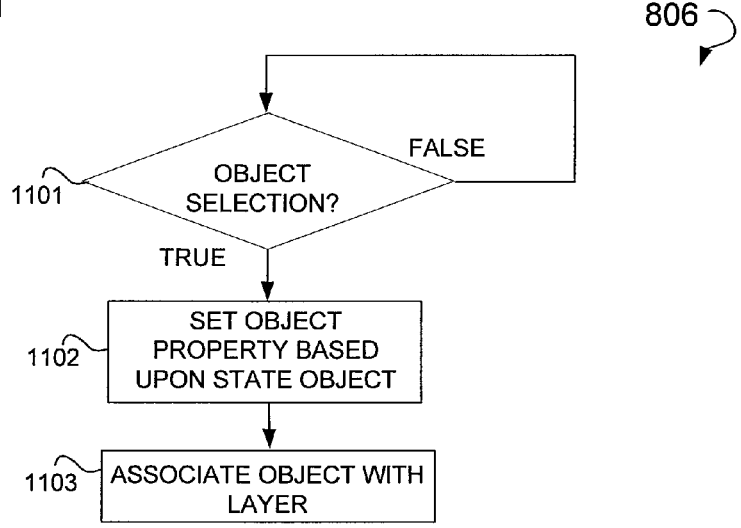
FIG. 11 is a flow chart illustrating the execution of an operation, according to an example embodiment, to determine whether the first object is associated with the second state.

FIG. 11 is a flow chart illustrating an example execution of operation 806. Shown is a decisional operation 1101 that determines whether or not an object has been selected. In cases where decisional operation 1101 evaluates to "false," decisional operation 1101 is re-executed. In cases where decisional operation 1101 evaluates to "true," an operation 1102 is executed. Operation 1102, when executed, sets an object property based upon a state object. Operation 1103 is executed to associate an object with a layer. An example of the execution of operation 806 is shown at 401.

Figure 12:
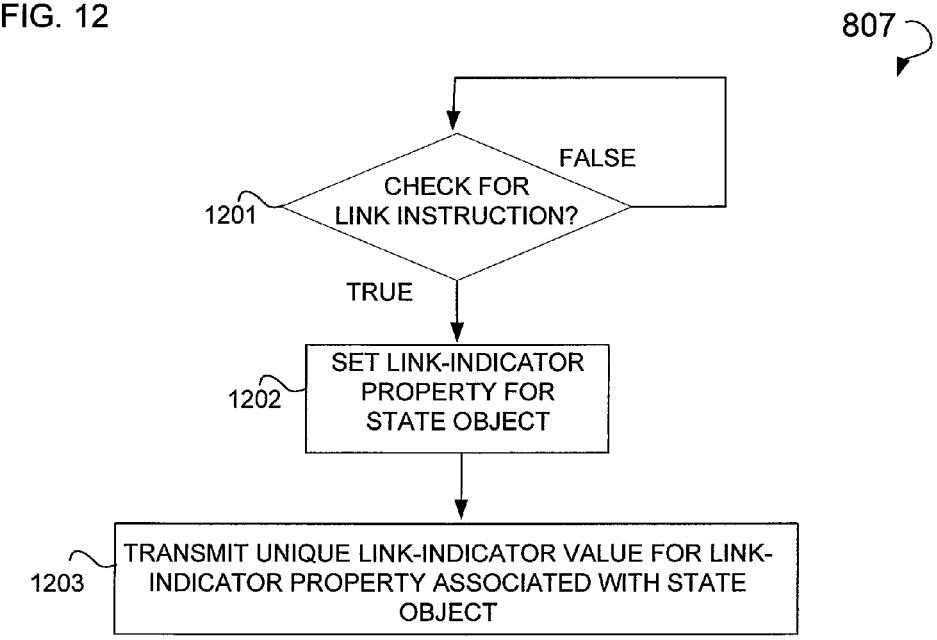
FIG. 12 is a flow chart illustrating the execution of an operation, according to an example embodiment, that determines whether a link instruction has been received.

FIG. 12 is a flow chart illustrating an example execution of operation 807. Shown is a decisional operation 1201 that determines whether or not a link instruction is received from user 101. In cases where decisional operation 1201 evaluates to "false," decisional operation 1201 is re-executed. In cases where decisional operation 1201 evaluates to "true," an operation 1202 is executed. Operation 1202, when executed, sets a link property for a state object. An operation 1203 is executed that transmits a unique link-indicator value for a link-indicator property associated with a state object. This unique link-indicator value may uniquely identify a particular object vis-à-vis other objects. This unique link-indicated value may be an integer value, or some other suitable numeric or alpha-numeric value.

Figure 13:
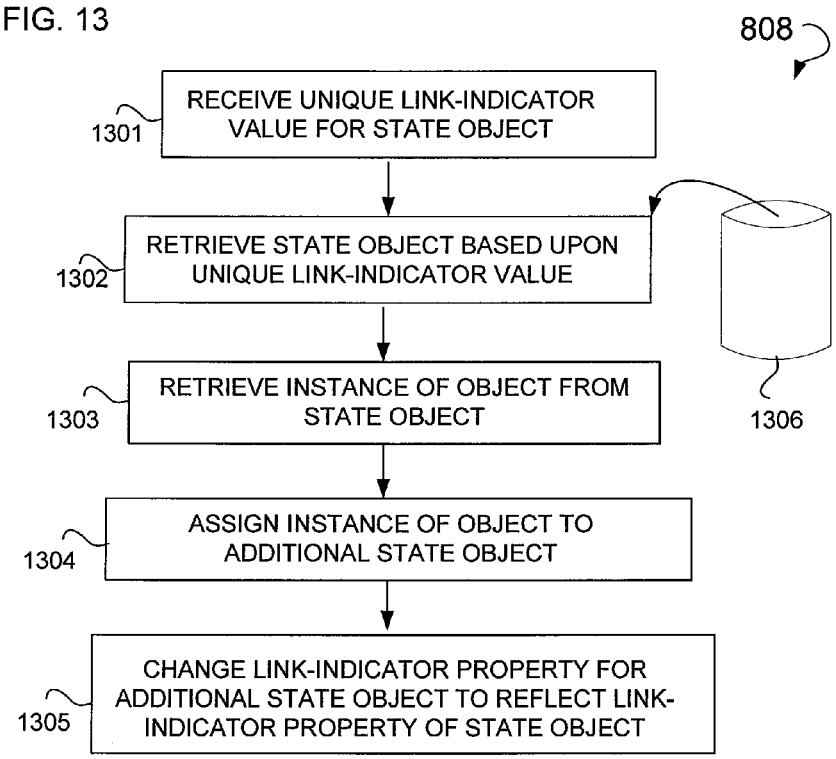
FIG. 13 is a flow chart illustrating the example execution of an operation, according to an example embodiment, that associates an object with a state thereby linking the object across states.

FIG. 13 is a flow chart illustrating an example execution of operation 808. Shown is an operation 1301 that is executed to receive a unique link-indicator value for a state object. Operation 1302 is executed to retrieve a state object based upon the unique link-indicator value. This state object is retrieved from the data store 1306. Operation 1303 is executed to retrieve an instance of an object from a state object. Operation 1304 is executed to assign an instance of an object to a further state object. Further operation 1305 is executed to change a link-indicated property for a further state object to reflect a link-indicator property of the state object. The result of the execution of operation 808 is illustrated in FIG. 4 by the link-indicator property 212 and the uniquely patterned icon 302.

Figure 14:
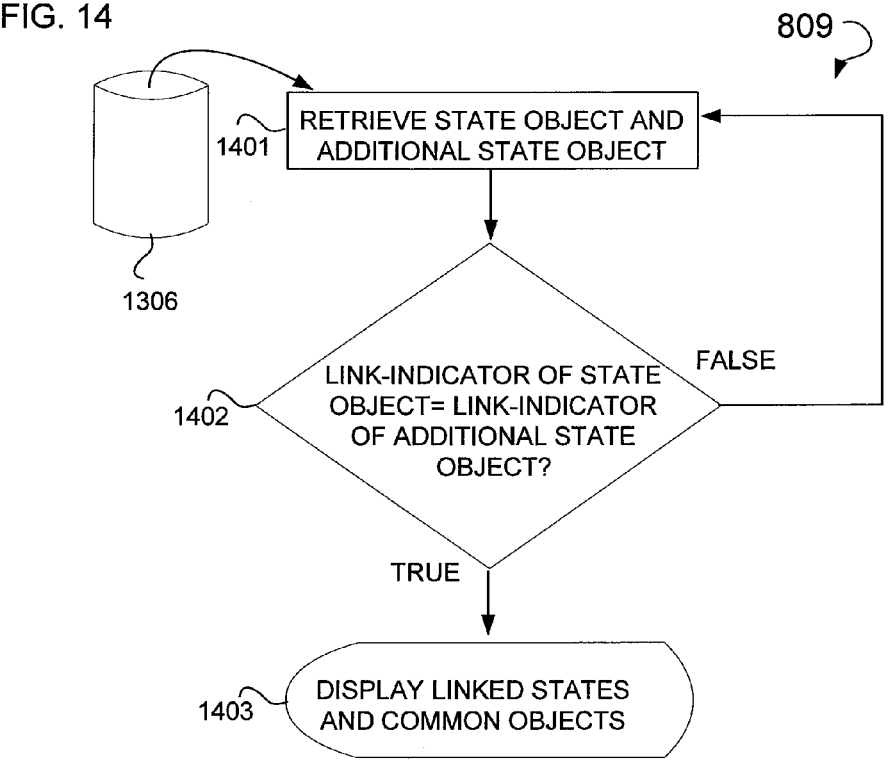
FIG. 14 is a flow chart illustrating the execution of an operation, according to an example embodiment, that displays the linked states and shared objects.

FIG. 14 is a flow chart illustrating an example execution of operation 809. Shown is an operation 1401 that retrieves a state object and further state object from the data store 1306. A decisional operation 1402 is executed that determines whether or not the link-indicator of the state object equals the link-indicator of the further object. In cases where a decisional operation 1402 evaluates to "false," the operation 1401 is re-executed. In cases where decisional operation 1402 evaluates to "true," an operation 1403 is executed that displays the link states and common (e.g., shared) objects. (See e.g., FIG. 4).

Figure 15:
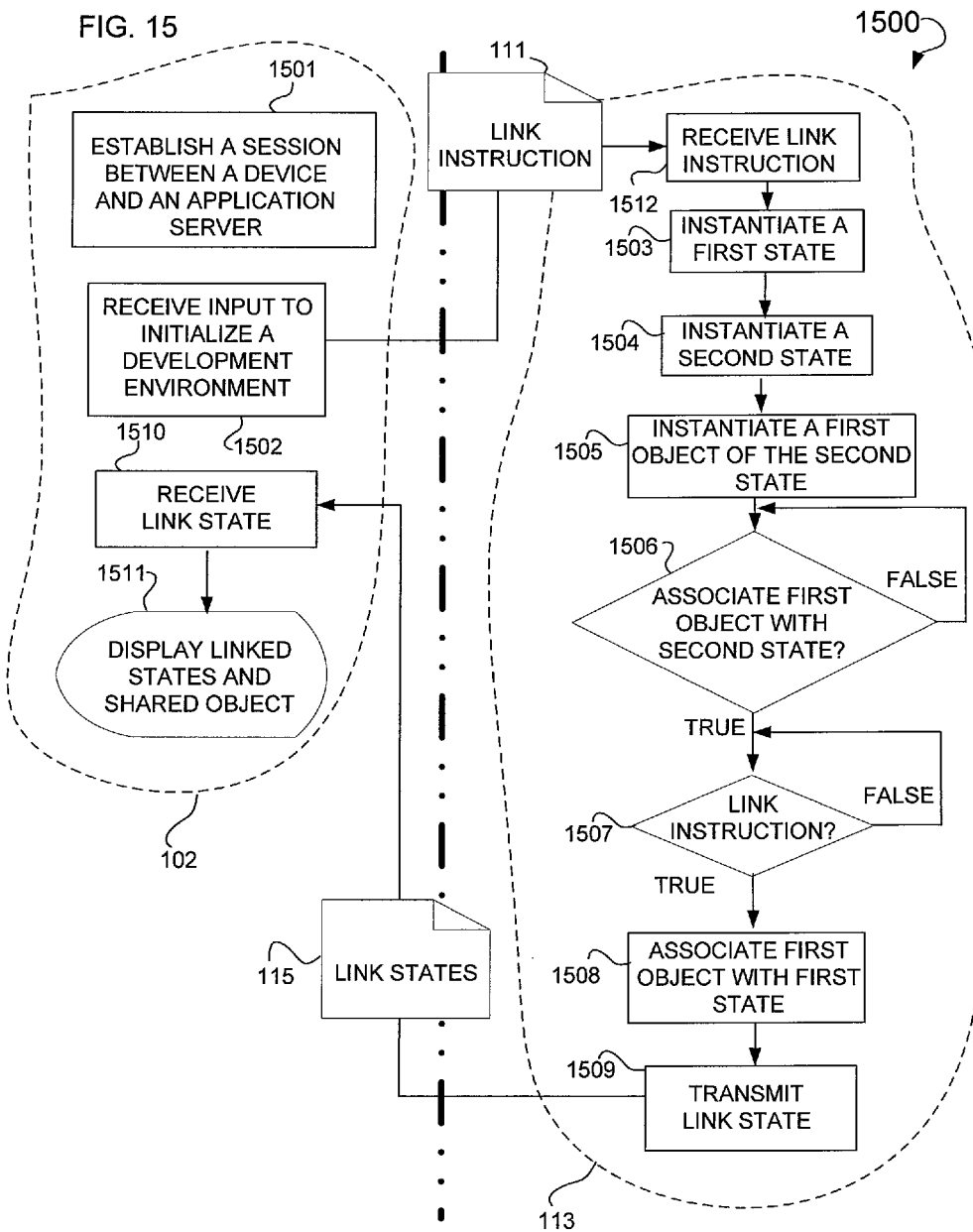
FIG. 15 is a dual-stream flow chart illustrating a method, according to an example embodiment, used to display linked states and shared objects.

FIG. 15 is a dual-stream flow chart illustrating an example method 1500 used to display linked states and shared objects. Shown are various operations 1501, 1502, and 1510 and 1511 that are executed upon the devices 102. Also shown are various operations 1512, and 1503 through 1509 that are executed upon the application server 113. In some example embodiments, an operation 1501 is executed to initiate a session between the devices 102 and the application server 113. A session includes a Transmission Control/Internet Protocol (TCP/IP) session, a login session, or some other suitable session. An operation 1502 is executed to receive input to initialize a development environment, and to transmit the link instruction 111 across a network 112 to receive through the execution of operation 1512. Operation 1503 is executed that instantiates a first state. Instantiate includes generating an instance of an object in the form of a state. An operation 1504 is executed that instantiates a second state. Operation 1505 is executed that instantiates a first object of the second state. A decisional operation 1506 is executed that determines whether the first object is associated with the second state. In cases where decisional operation 1506 evaluates to "false," decisional operation 1506 is re-executed. In cases where decisional operation 1506 evaluates to "true," a further decisional operation 1507 is executed. Decisional operation 1507 determines whether or not a link instruction has been received. This link instruction may be the link instruction 108, and may be generated by the user 101. For example, the user 101 may utilize the graphical pointer 201 to select a link-indicator property such that an object is linked across states. (See e.g., FIG. 4.) Where decisional operation 1507 evaluates to "false," decisional operation 1507 is re-executed. In cases where decisional operation 1507 evaluates to "true," operation 1508 is executed. Operation 1508 associates the first object with the first state thereby linking the object across states (e.g., the first object is linked to both the first and second states). Operation 1509 is executed to transmit the link states 115. Operation 1510 is executed to receive the link states 115. A display 1511 is executed that displays the linked states and shared objects (see e.g., FIG. 4).

Example Database

Some embodiments may include the various databases (e.g., 109, 114, 1002, and 1306) being relational databases, or, in some cases, On Line Analytic Processing (OLAP)-based databases. In the case of relational databases, various tables of data are created and data is inserted into and/or selected from these tables using a Structured Query Language (SQL) or some other database-query language known in the art. In the case of OLAP databases, one or more multi-dimensional cubes or hyper cubes, including multidimensional data from which data is selected from or inserted into using a Multidimensional Expression (MDX) language, may be implemented. In the case of a database using tables and SQL, a database application such as, for example, MYSQL™, MICROSOFT SQL SERVER™, ORACLE 8I™, 10G™, or some other suitable database application may be used to manage the data. In this, the case of a database using cubes and MDX, a database using Multidimensional On Line Analytic Processing (MOLAP), Relational On Line Analytic Processing (ROLAP), Hybrid Online Analytic Processing (HOLAP), or some other suitable database application may be used to manage the data. The tables or cubes made up of tables, in the case of, for example, ROLAP, are organized into an RDS or Object Relational Data Schema (ORDS), as is known in the art. These schemas may be normalized using certain normalization algorithms so as to avoid abnormalities such as non-additive joins and other problems. Additionally, these normalization algorithms may include Boyce-Codd Normal Form or some other normalization or optimization algorithm known in the art.

Figure 16:
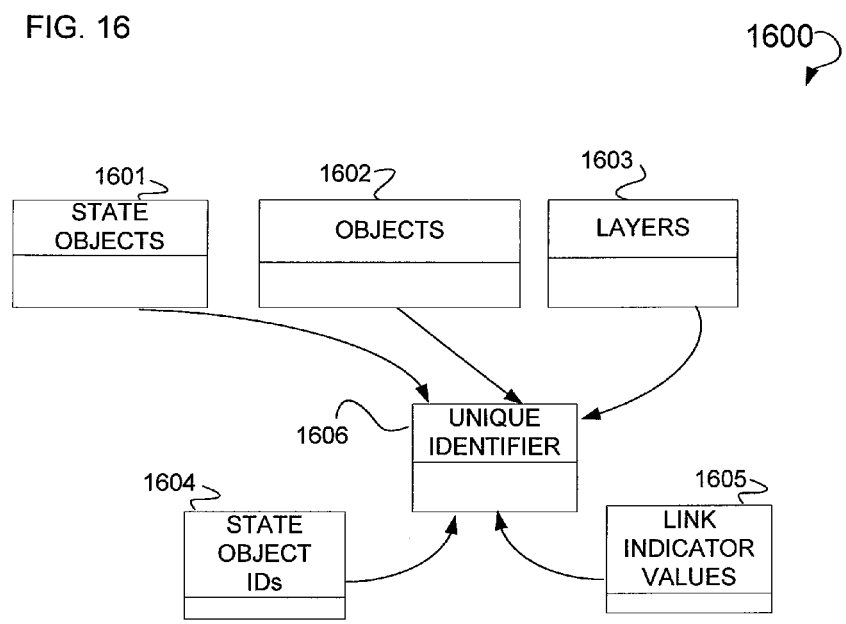
FIG. 16 is a diagram of a Relational Data Schema (RDS), according to an example embodiment.

FIG. 16 is a diagram of a RDS 1600. Shown is a table 1601 that includes state objects. These state objects may be stored into the table 1601 using an XML data type, a Binary Large Object (BLOB) data type, or some other suitable data type. A table 1602 is shown that includes objects. These objects may be stored into the table 1602 using, for example, an XML data type or a BLOB data type. A table 1603 is shown. Table 1603 includes layers. These layers may be stored into the table 1603 using an XML data type or a BLOB data type. A table 1604 is shown that includes state object IDs. These state object IDs may be stored into the table 1604 using, for example, an integer, string, or some other suitable numeric data type. Table 1605 is shown that includes link-indicator values. These link-indicator values may be stored as, for example, a boolean, integer, or other suitable data type. A table 1606 is shown that includes unique identifier values. These unique identifier values may be values used to uniquely identify various entries into the tables 1601 through 1605. An integer data type may be used to store data into the table 1606.

Distributed Computing Components and Protocols

Some example embodiments may include remote procedure calls being used to implement one or more of the above-illustrated operations across a distributed programming environment. For example, a logic level may reside on a first computer system that is located remotely from a second computer system including an interface level (e.g., a GUI). These first and second computer systems can be configured in a server-client, peer-to-peer, or some other configuration. The various levels can be written using the above-illustrated component design principles and can be written in the same programming language or in different programming languages. Various protocols may be implemented to enable these various levels and the components included therein to communicate regardless of the programming language used to write these components. For example, an operation written in C++ using Common Object Request Broker Architecture (CORBA) or Simple Object Access Protocol (SOAP) can communicate with another remote module written in Java™. Suitable protocols include SOAP, CORBA, and other protocols well-known in the art.

A Computer System

Figure 17:
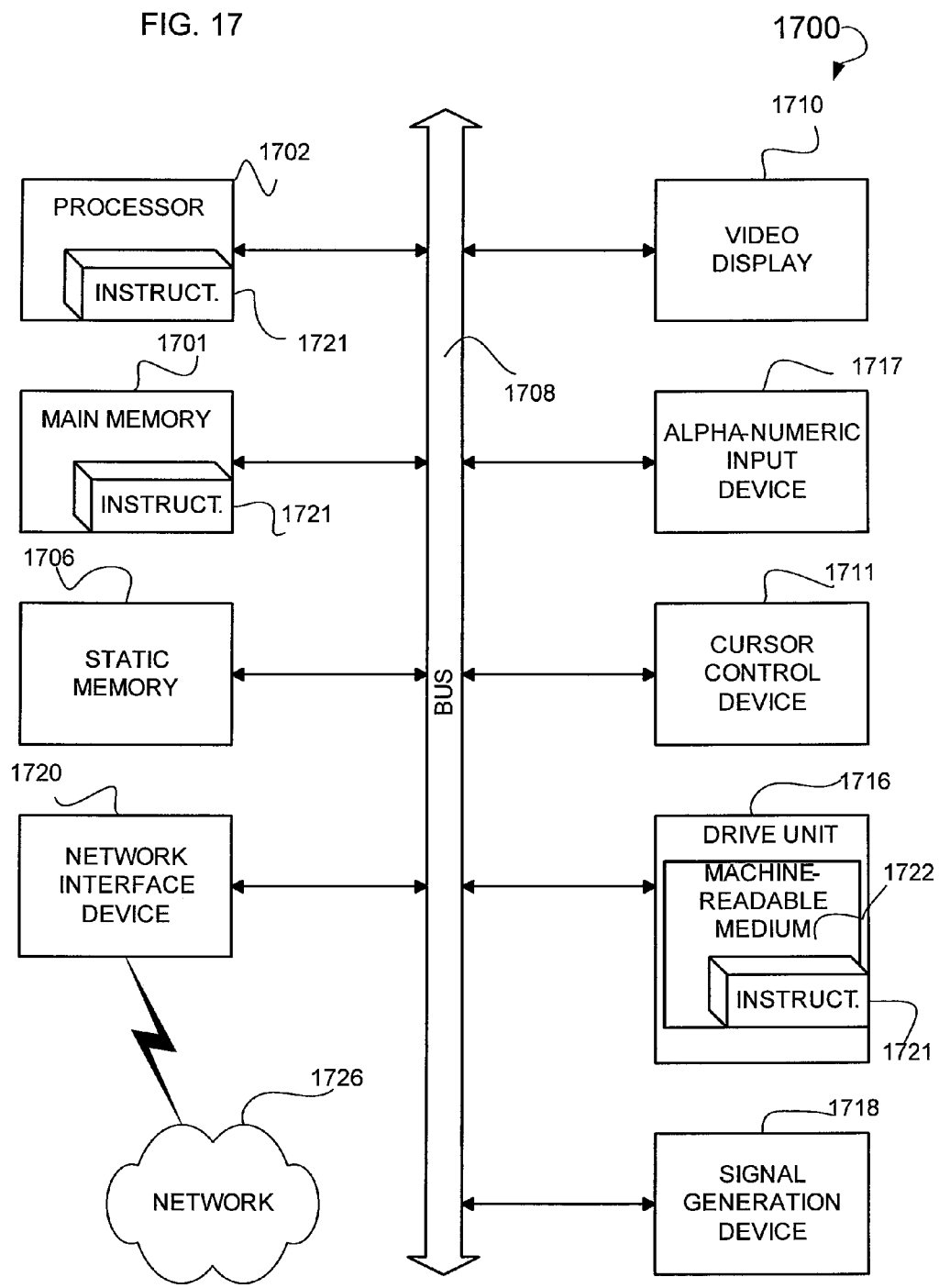
FIG. 17 shows a diagrammatic representation of a machine in the form of a computer system, according to an example embodiment, that executes a set of instructions to perform any one or more of the methodologies discussed herein.

FIG. 17 shows a diagrammatic representation of a machine in the example form of a computer system 1700 that executes a set of instructions to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment or as a peer machine in a peer-to-peer (or distributed) network environment. The machine may be a Personal Computer (PC), a tablet PC, a Set-Top Box (STB), a PDA, a cellular telephone, a Web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Example embodiments can also be practiced in distributed system environments where local and remote computer systems, which are linked (e.g., either by hardwired, wireless, or a combination of hardwired and wireless connections) through a network, both perform tasks such as those illustrated in the above description.

The example computer system 1700 includes a processor 1702 (e.g., a Central Processing Unit (CPU), a Graphics Processing Unit (GPU) or both), a main memory 1701, and a static memory 1706, which communicate with each other via a bus 1708. The computer system 1700 may further include a video display unit 1710 (e.g., a Liquid Crystal Display (LCD) or a Cathode Ray Tube (CRT)). The computer system 1700 also includes an alphanumeric input device 1717 (e.g., a keyboard), a User Interface (UI) (e.g., GUI) cursor controller 1711 (e.g., a mouse), a drive unit 1716, a signal generation device 1718 (e.g., a speaker) and a network interface device (e.g., a transmitter) 1720.

The disk drive unit 1716 includes a machine-readable medium 1722 on which is stored one or more sets of instructions and data structures (e.g., software) 1721 embodying or used by any one or more of the methodologies or functions illustrated herein. The software instructions 1721 may also reside, completely or at least partially, within the main memory 1701 and/or within the processor 1702 during execution thereof by the computer system 1700, the main memory 1701 and the processor 1702 also constituting machine-readable media.

The software instructions 1721 may further be transmitted or received over a network 1726 via the network interface device 1720 using any one of a number of well-known transfer protocols (e.g., Hyper Text Transfer Protocol (HTTP), Secure Hyper Text Transfer Protocol (HTTPS)).

The term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that cause the machine to perform any one or more of the methodologies illustrated herein. The term "machine-readable medium" shall accordingly be taken to include, but not be limited to, solid-state memories, optical and magnetic media, and carrier wave signals.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A computer implemented method comprising:
   receiving a first assignment of a user interface object to a first user interface state of a user interface, the first user interface state being at least partially defined by respective configurations of a collection of user interface objects included within the user interface in the first user interface state, the user interface object comprising a layer;
   receiving a link instruction identifying a second assignment of the user interface object to a second user interface state, the second assignment of the user interface object to the second user interface state including a relationship that is an inheritance relationship or an eXtensible Markup Language (XML) hierarchy relationship;
   processing the link instruction to include the user interface object in the second user interface state; and
   displaying, in a display area a first visual representation of the first assignment of the user interface object to the first user interface state and a second visual representation of the second assignment of the user interface object to the second user interface state, wherein the display area further comprises a list of available user interface objects, the user interface object being included in the available user interface objects, wherein the first visual representation and the second visual representation are included in the list, wherein the first visual representation is in a form of a first icon representing the first assignment, wherein the second visual representation is in a form of a second icon representing the second assignment, and wherein the user interface object and the second user interface state share a common representation of the second icon.

2. The computer implemented method of claim 1, wherein the user interface object further comprises at least one of a component, a widget, user interface control, a group, a graphic artwork, or a path.

3. The computer implemented method of claim 1, wherein the first user interface state is a configuration of properties of the collection of user interface objects, the method further including presenting the first user interface state within an interface design application.

4. The computer implemented method of claim 3, wherein the interface design application includes an Integrated Development Environment (IDE).

5. The computer implemented method of claim 1, wherein the second assignment of the user interface object to the second user interface state includes the user interface object being accessible in the second user interface state.

6. The computer implemented method of claim 5, wherein the user interface object accessible to the second user interface state includes a property that is specific to the user interface object for the first user interface state.

7. The computer implemented method of claim 6, wherein the property includes at least one of a color or a pattern.

8. The computer implemented method of claim 1, further comprising displaying, in the display area, a default icon representing an option to assign the user interface object to the second user interface state.

9. The computer implemented method of claim 8, further comprising:
selecting the default icon to assign the user interface object to the second user interface state; and
displaying the user interface object in the display area.

10. The computer implemented method of claim 9, further comprising displaying the user interface object in the second user interface state.

11. The computer implemented method of claim 1, further comprising:
de-selecting the second icon to unassign the user interface object from the second user interface state; and
removing the user interface object from the display area.

12. The computer implemented method of claim 11, further comprising removing the user interface object from the second user interface state.

13. The computer implemented method of claim 1, wherein the first icon includes at least one of a pattern, a color, a shape, or a color chip.

14. The computer implemented method of claim 1, wherein each of the available user interface objects in the list is accompanied by a first visual representation for the first user interface state indicating whether the accompanying available user interface object is assigned to the first user interface state, and a second visual representation for the second user interface state indicating whether the accompanying available user interface object is assigned to the second user interface state.

15. A computer system comprising:
an association engine to receive a first assignment of a user interface object and a first user interface state of a user interface, the first user interface state being at least partially defined by respective configurations of a collection of user interface objects included within the user interface in the first user interface state, the user interface object comprising a layer;
a receiver to receive a link instruction identifying a second assignment of the user interface object to a second user interface state, the second assignment of the user interface object to the second user interface state including a relationship that is an inheritance relationship or an eXtensible Markup Language (XML) hierarchy relationship;
a processor to, using one or more central processing units, process the link instruction to assign the user interface object to the second user interface state; and
a display to display, in a display area, a first visual representation of the first assignment of the user interface object to the first user interface state and a second visual representation of the second assignment of the user interface object to the second user interface state, wherein the display area further comprises a list of available user interface objects, the user interface object being included in the available user interface objects, wherein the first visual representation and the second visual representation are included in the list, wherein the first visual representation is in a form of a first icon representing the first assignment, wherein the second visual representation is in a form of a second icon representing the second assignment, and wherein the user interface object and the second user interface state share a common representation of the second icon.

16. The computer system of claim 15, wherein the user interface object further comprises at least one of a component, a widget, user interface control, a group, a graphic artwork, or a path.

17. The computer system of claim 15, wherein the first user interface state is a configuration of properties of the collection of user interface objects, the computer system further including a further display to present the first user interface state within an interface design application.

18. The computer system of claim 17, wherein the interface design application includes an Integrated Development Environment (IDE).

19. The computer system of claim 15, wherein the second assignment of the user interface object to the second user interface state includes the user interface object being accessible in the second user interface state.

20. The computer system of claim 19, wherein the user interface object accessible to the second user interface state includes a property that is specific to the user interface object for the first user interface state.

21. The computer system of claim 20, wherein the property includes at least one of a color or a pattern.

22. The computer system of claim 15, further comprising a further display that displays, in the display area, a default icon representing an option to assign the user interface object to the second user interface state.

23. The computer system of claim 22, further comprising:
an input device to select the default icon to assign the user interface object with the second user interface state; and
the further display to display the user interface object in the display area.

24. The computer system of claim 23, further comprising the further display to display the user interface object for view in the second user interface state.

25. The computer system of claim 15, further comprising:
an input device to de-select the second icon to unassign the user interface object from the second user interface state; and
a removal engine to remove the user interface object from the display area.

26. The computer system of claim 25, further comprising the removal engine to remove the user interface object from the second user interface state.

27. The computer system of claim 15, wherein the first icon includes at least one of a pattern, a color, a shape, or a color chip.

28. A non-transitory machine-readable medium comprising instructions, which when implemented by one or more machines, cause the one or more machines to perform the following operations:
receiving a first assignment of a user interface object to a first user interface state of a user interface, the first user interface state being at least partially defined by respective configurations of a collection of user interface objects included within the user interface in the first user interface state, the user interface object comprising a layer;
receiving a link instruction identifying a second assignment of the user interface object to a second user interface state, the second assignment of the user interface object to the second user interface state including a relationship that is an inheritance relationship or an eXtensible Markup Language (XML) hierarchy relationship;

processing the link instruction to include the user interface object in the second user interface state; and displaying, in a display area, a first visual representation of the first assignment of the user interface object to the first user interface state and a second visual representation of the second assignment of the user interface object to the second user interface state, wherein the display area further comprises a list of available user interface objects, the user interface object being included in the available user interface objects, wherein the first visual representation and the second visual representation are included in the list, wherein the first visual representation is in a form of a first icon representing the first assignment, wherein the second visual representation is in a form of a second icon representing the second assignment, and wherein the user interface object and the second user interface state share a common representation of the second icon.

\* \* \* \* \*